(12) United States Patent
Hiraoka

(10) Patent No.: US 7,338,113 B2
(45) Date of Patent: Mar. 4, 2008

(54) WORKING MACHINE

(75) Inventor: Yukio Hiraoka, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 11/470,888

(22) Filed: Sep. 7, 2006

(65) Prior Publication Data

US 2007/0069551 A1 Mar. 29, 2007

(30) Foreign Application Priority Data

Sep. 28, 2005 (JP) ............................. 2005-282982

(51) Int. Cl.
*B62D 33/06* (2006.01)

(52) U.S. Cl. .......................... 296/190.03; 296/193.06; 180/89.12; 34/37

(58) Field of Classification Search ................ 296/102, 296/190.01, 190.03, 190.08, 193.01, 193.06; 296/193.12; 180/89.12, 89.19; 414/914; D12/222, 401; D34/34, 37
See application file for complete search history.

(56) References Cited

U.S. PATENT DOCUMENTS

| | | | | |
|---|---|---|---|---|
| 2,911,232 A * | 11/1959 | Hastings, Jr. et al. | ....... | 280/756 |
| 3,451,715 A * | 6/1969 | Stuckenberger | ............. | 296/102 |
| 4,600,236 A * | 7/1986 | Weiss et al. | ........... | 296/190.03 |
| 4,650,242 A * | 3/1987 | Obe et al. | ............... | 296/190.08 |
| 5,108,253 A * | 4/1992 | Kobayashi et al. | ......... | 414/694 |
| 5,842,732 A * | 12/1998 | Daggett et al. | ............. | 296/102 |
| 6,149,228 A * | 11/2000 | O'Neill et al. | ......... | 296/190.03 |
| 6,189,955 B1 * | 2/2001 | Fryk et al. | ............. | 296/190.08 |
| 6,260,912 B1 * | 7/2001 | Mondragon Sarmiento et al. | ..... | 296/190.08 |
| 6,315,351 B1 * | 11/2001 | Mondragon Sarmiento et al. | ..... | 296/190.08 |
| 7,001,135 B2 | 2/2006 | Shimokakiuchi et al. | | |
| 7,246,846 B2 * | 7/2007 | Shioji et al. | ........... | 296/190.11 |
| 2001/0017462 A1 | 8/2001 | Abels et al. | | |
| 2001/0050495 A1 * | 12/2001 | Sorensen et al. | ........... | 296/102 |
| 2002/0149232 A1 | 10/2002 | Sakyo et al. | | |
| 2006/0006696 A1 * | 1/2006 | Umemoto et al. | ..... | 296/190.08 |
| 2007/0075562 A1 * | 4/2007 | Reeves | ........................ | 296/102 |

FOREIGN PATENT DOCUMENTS

| | | | | |
|---|---|---|---|---|
| DE | 3229925 A1 * | 3/1983 | ................. | 280/847 |
| DE | 200 02 106 U1 | 5/2000 | | |
| EP | 0 727 529 A1 | 8/1996 | | |
| JP | 63149271 A * | 6/1988 | .............. | 180/89.12 |
| JP | 9-296481 | 11/1997 | | |
| JP | 10-129992 | 5/1998 | | |
| JP | 10-219740 | 8/1998 | | |
| JP | 11-269928 | 10/1999 | | |
| JP | 2000-96619 | 4/2000 | | |
| JP | 2001-279718 | 10/2001 | | |
| JP | 2004-268907 | 9/2004 | | |

* cited by examiner

*Primary Examiner*—D. Glenn Dayoan
*Assistant Examiner*—Paul Chenevert
(74) *Attorney, Agent, or Firm*—Oblon, Spivak, McClelland, Maier & Neustadt, P.C.

(57) ABSTRACT

A left support pillar includes a protective portion extending substantially vertically in front of a back rest of the operator seat so as to cover an operator seat sideways, a fixing portion fixed onto a rotating frame at a position behind the operator seat, and a connecting portion adapted to extend forward from the fixing portion and to be connected to a lower end of the protective portion. The protective portion is disposed within a predetermined range of a seating surface of the operator seat and is formed upward from a position lower than an upper end of the back rest.

10 Claims, 5 Drawing Sheets

WORKING MACHINE

BACKGROUND OF THE INVENTION

1. Field of the Invention

The present invention relates to a working machine, particularly a small-sized working machine, having a canopy structure wherein an operator seat is open to the exterior.

2. Description of the Related Art

Heretofore, as a small-sized working machine there has been known what is called a mini-excavator having a lower traveling body, an upper rotating body mounted rotatably on the lower traveling body, and an operator seat mounted on device covers of the upper rotating body.

For example, in Japanese Patent Laid-Open No. 2001-279718 there is disclosed a mini-excavator wherein a roof is held above an operator seat by support pillars erected behind the operator seat.

In this type of a mini-excavator it is desirable to erect support pillars sideways of the operator seat in order to protect the operator seat which is open to the exterior in the event that the mini-excavator should turn sideways.

However, in the mini-excavator in question, it has so far been difficult to ensure a space for erecting the support pillars sideways of the operator seat.

More particularly, driving devices such as a working oil tank for operating the excavator and a fuel tank are installed within a device cover disposed at right and left positions of the operator seat, so in order to ensure support pillar erecting space on a rotating frame with those devices mounted thereon, it is necessary to for example change a layout of those devices. Consequently, working efficiency for maintenance of those devices is sacrificed.

It may be effective to erect the support pillars directly on the device cover. However, also in this case, there arises the necessity of restricting for example opening/closing directions of the device cover, with a consequent likelihood of causing deterioration in the working efficiency for maintenance of the driving devices.

SUMMARY OF THE INVENTION

It is an object of the present invention to provide a working machine, especially a small-sized working machine, having a canopy structure capable of protecting an operator seat while keeping working efficiency for maintenance to a satisfactory extent.

The working machine having a canopy structure according to the present invention has the following basic configuration.

That is, the working machine of the present invention comprises a lower traveling body, an upper rotating body mounted rotatably on the lower traveling body, an operator seat disposed on top of a rotating frame of the upper rotating body, and a protective pillar erected on the rotating frame to protect the operator seat sideways. The protective pillar comprises a protective portion extending substantially vertically in front of a back rest of the operator seat so as to cover the operator seat sideways, a fixing portion fixed onto the rotating frame at a position behind the operator seat, and a connecting portion adapted to extend forward from the fixing portion and to be connected to a lower end of the protective portion. The protective portion is disposed within a range of a seating surface of the operator seat in side view and is formed upward from a position lower than an upper end of the back rest.

According to the present invention, since the protective portion is contiguous to the connecting portion adapted to extend forward from the fixing portion which is fixed onto the rotating frame at a position behind the operator seat, the operator seat can be protected sideways by the protective portion. Thus, unlike the case where a support pillar is provided directly onto the rotating frame, the protective pillar can be disposed by utilizing the space behind the operator seat which has heretofore been ensured without changing the layout of driving devices on the rotating frame or the like.

Therefore, according to the present invention, even in the case where the space formed on the rotating frame and sideways of the operator seat is limited, the protective pillar can be mounted without changing the layout of driving devices on the rotating frame or the like. Consequently, even in the event that the working machine should turn sideways, it is possible to protect the operator seat while ensuring the workability for maintenance of the driving devices.

By "extending forward" in connection with the connecting portion is meant to include not only extending in the horizontal direction but also tilting in the vertical or transverse direction.

Preferably, the above canopy structure is further provided with an upper protective frame which is held above the operator seat, and an upper end of the protective portion is connected to the upper protective frame.

In this case, the driver seat can be protected sideways in a vertical range from a position lower than the upper end of the back rest up to the upper protective frame.

Preferably, the rotating frame is provided with a frame body secured to the lower traveling body and a support frame projected on the frame body to support the operator seat, and the fixing portion is fixed to an upper portion of the support frame.

In this case, since the fixing portion is fixed to the upper portion of the support frame, the overall length of the protective pillar can be made shorter than in case of fixing the fixing portion to the frame body and therefore the sectional area of the protective pillar necessary for ensuring the same strength can be so much decreased. Consequently, not only the operator's sight can be ensured to a satisfactory extent but also the cost of the protective pillar can be reduced as a result of shortening of the overall length and decrease of the sectional area.

The attitude of the fixing portion at the time of mounting the rotating frame is not specially limited, but preferably the fixing portion is fixed to the rotating frame in an attitude such that the axis thereof is orthogonal to the vertical direction and an advancing direction of the lower traveling body.

In this case, an external force applied when the working machine turns sideways (an external force which the protective pillar undergoes upon collision thereof with the ground) is inputted in the axial direction of the fixing portion. Thus, it is possible to prevent the protective pillar from undergoing a flexural deformation in the fixing portion for the rotating frame due to the external force and hence possible to further improve the strength of protection for the operator seat.

In case of erecting a pair of right and left pillar members on the rotating frame and at a position behind the operator seat, the operator seat can be protected from one side by forming at least one of the pillar members as a protective pillar. Further, the operator seat can be protected from both right and left sides by forming both pillar members as protective pillars.

In this case, it is further preferable that the upper protective frame be supported by a front support pillar and the pillar members, the front support pillar being erected on the rotating frame in front of the operator seat.

In this case, the external force inputted to the protective portion when the working machine turns sideways can be dispersed through the upper protective frame to the pillar members and the front support pillar. Therefore, out of the pillar members and the front support pillar, one which undergoes the external force (one which comes into collision with the ground when the working machine turns sideways) is prevented from being deformed to an extreme extent and the operator seat can thereby be protected in a more positive manner.

DESCRIPTION OF THE PREFERRED EMBODIMENTS

Preferred embodiments of the present invention will be described hereinunder with reference to the drawings.

Figure 1:
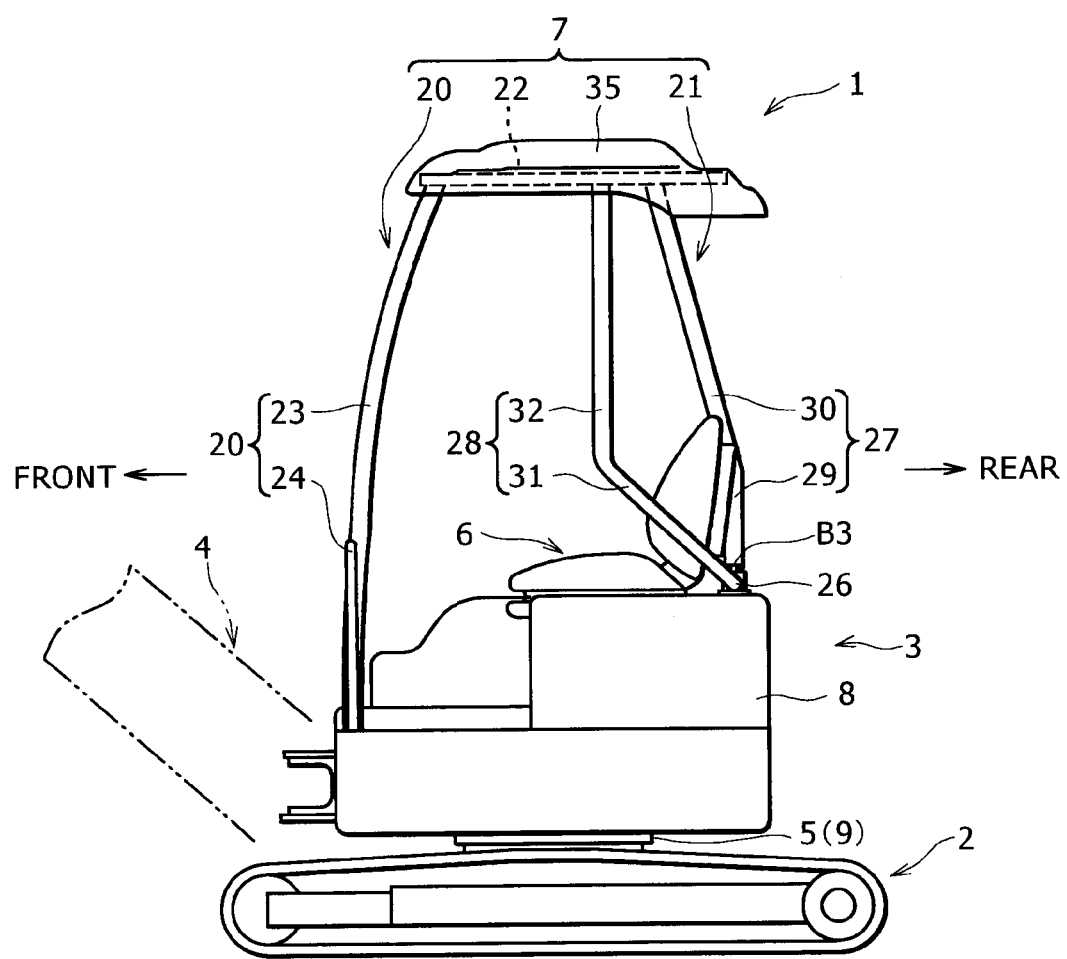
FIG. 1 is a side view showing a configuration of a small-sized hydraulic excavator to which a canopy structure according to the present invention is applied.

FIG. 1 is a side view showing a configuration of a small-sized hydraulic excavator to which a canopy structure according to the present invention is applied.

In a small-sized hydraulic excavator 1, as shown in FIG. 1, an upper rotating body 3 is mounted rotatably on a crawler type lower traveling body 2 and a front attachment 4 is provided on a front side of the upper rotating body 3. Though not shown, the front attachment 4 is mainly composed of a boom, an arm, a bucket, and a hydraulic cylinder for actuating those members.

Figure 2:
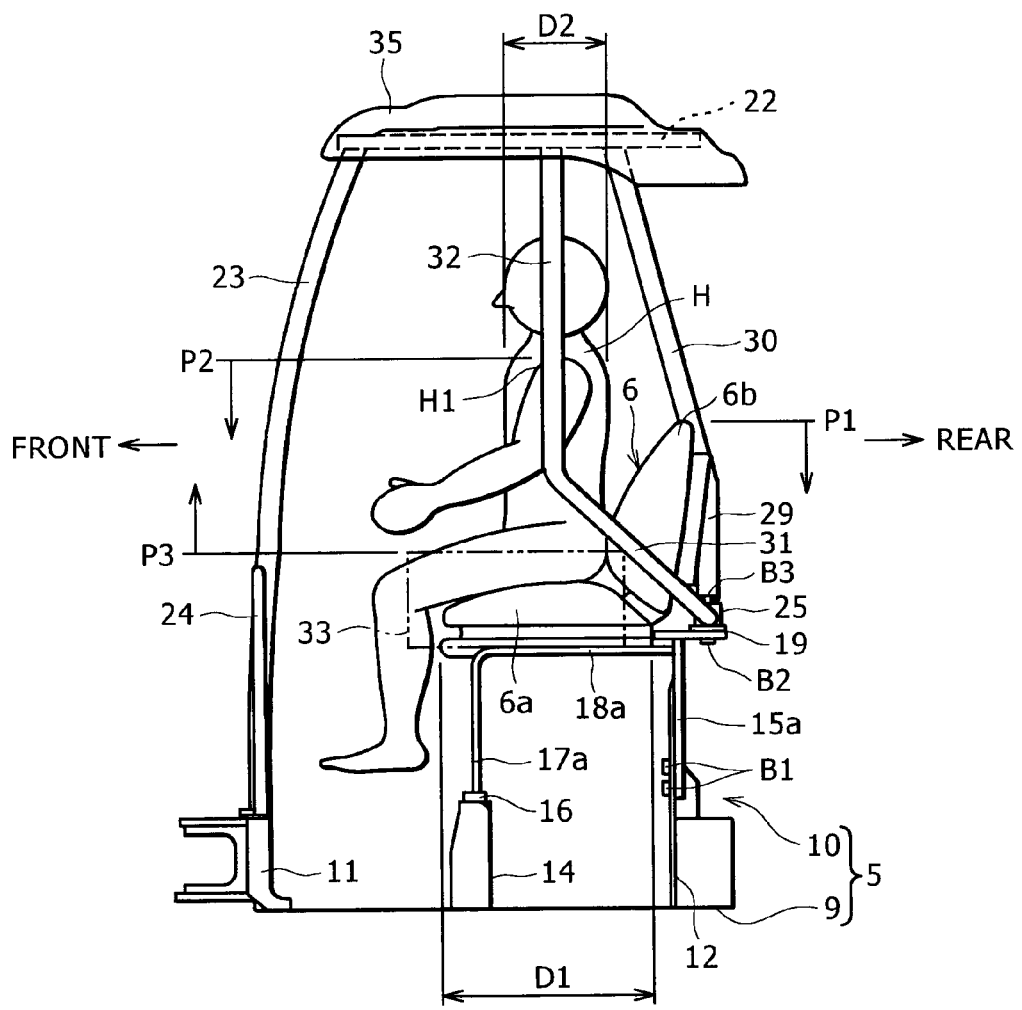
FIG. 2 is a side view showing a frame structure of an upper rotating body shown in FIG. 1.

FIG. 2 is a side view showing a frame structure of the upper rotating body 3 shown in FIG. 1.

Referring to FIGS. 1 and 2, the upper rotating body 3 includes a rotating frame 5 mounted rotatably on the lower traveling body 2, as well as components mounted on the rotating frame 5, which are an operator seat 6, a canopy 7, and a device cover 8. In the following description it is assumed that, when an operator H sitting on the operator seat 6 sees the front, the right and left direction is the transverse direction of the small-sized hydraulic excavator 1.

The rotating frame 5 includes a frame body 9 mounted rotatably on the lower traveling body 2 and a seat stand (support frame) 10 projected from an upper rear portion of the frame body 9.

The frame body 9 is a generally rectangular plate member extending in the longitudinal direction. On the frame body 9 there are erected a front pedestal 11 along a front edge, a pair of mounting portions 12 (only one is shown in FIG. 2) arranged right and left along the rear edge, and a rear pedestal 14 extending right and left between the pedestal 11 and the mounting portions 12.

Figure 3:
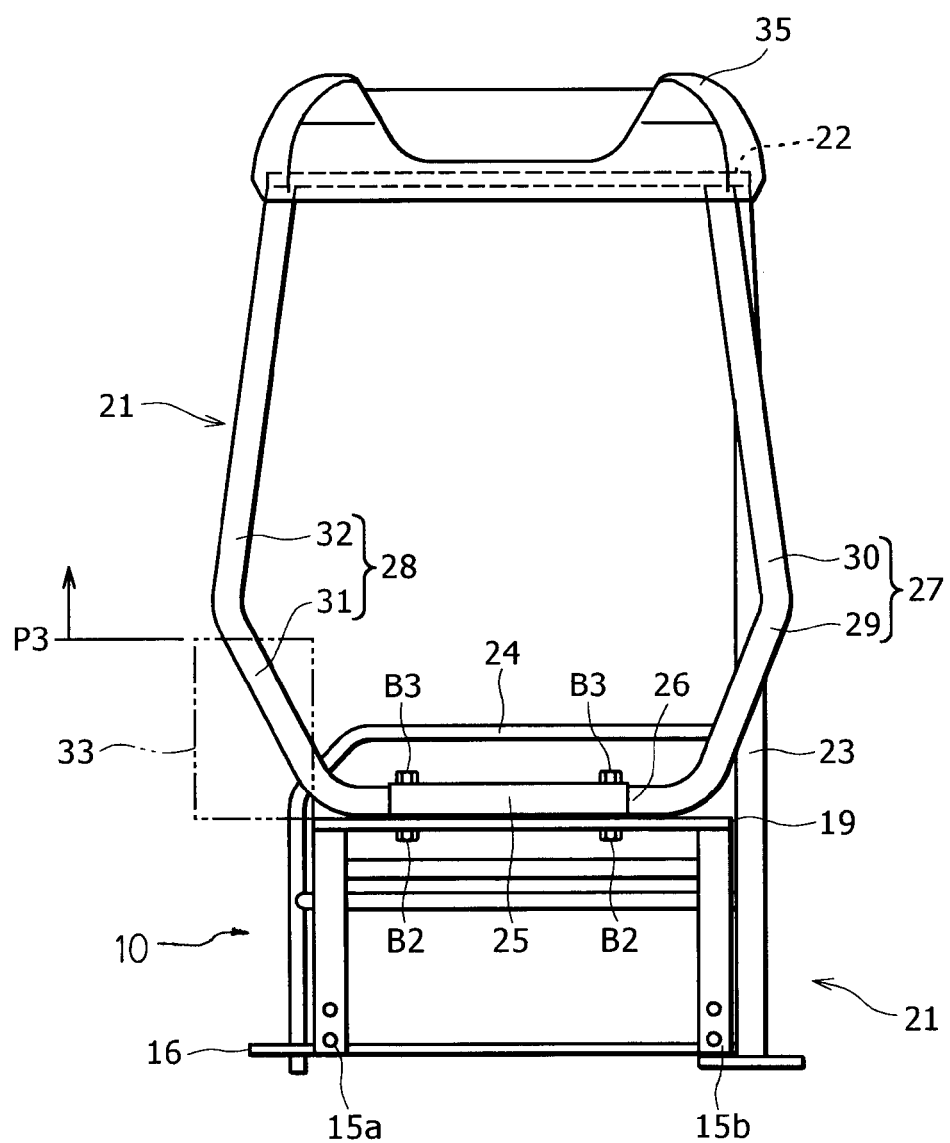
FIG. 3 is a rear view showing a rotating frame of the upper rotating body shown in FIG. 2 in an omitted state.

FIG. 3 is a rear view showing the rotating frame 5 of the upper rotating body 3 shown in FIG. 2 in an omitted state.

Figure 4:
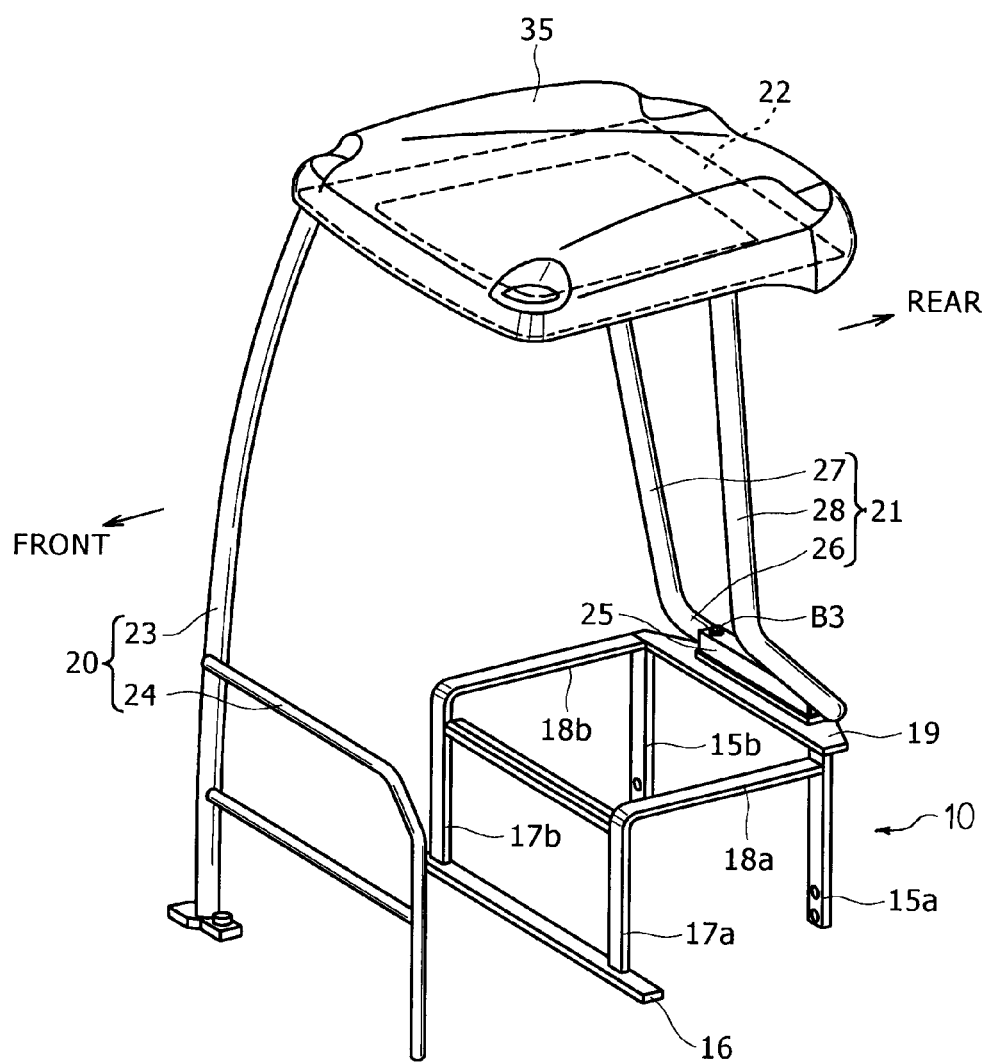
FIG. 4 is a perspective view of the upper rotating body shown in FIG. 3.
Figure 5:
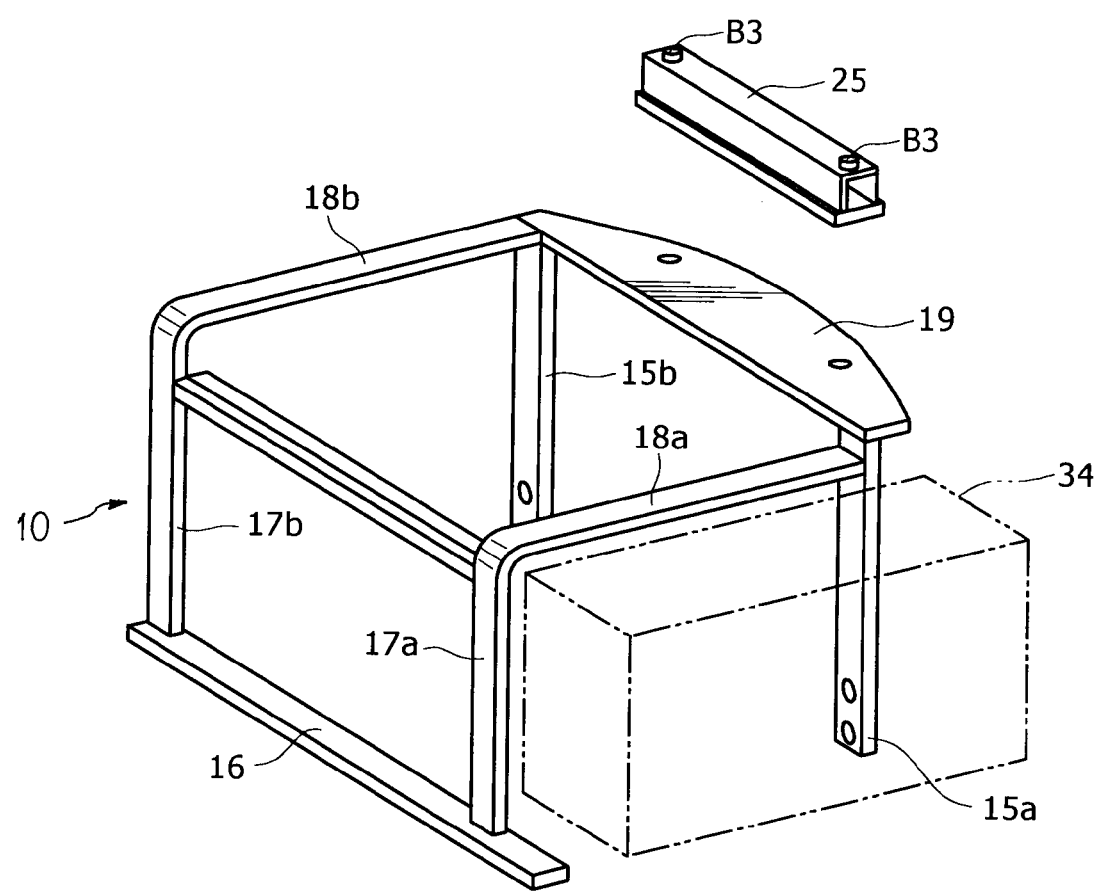
FIG. 5 is a perspective view showing an enlarged seat stand.

FIG. 4 is a perspective view of the upper rotating body 3 shown in FIG. 3. FIG. 5 is a perspective view showing the enlarged seat stand 10.

Referring to FIGS. 2 to 5, the seat stand 10 is a generally rectangular frame mounted on the mounting portions 12 and the rear pedestal 14. The seat stand 10 (see FIG. 2) supports the operator seat 6 thereon.

More specifically, the seat stand 10 includes a pair of left and right rear legs 15a and 15b secured with bolts B1 to the mounting portions 12, a seat plate 16 mounted on the rear pedestal 14, a pair of left and right front legs 17a and 17b erected on the seat plate 16, a pair of left and right upper-side portions 18a and 18b which provide connections between upper portions of the front legs 17a and 17b and upper portions of the rear legs 15a and 15b, and a mounting plate 19 which connects upper ends of the rear legs 15a and 15b with each other. The upper-side portions 18a and 18b are formed by rearward bending of the front legs 17a and 17b.

The upper-side portions 18a and 18b of the seat stand 10 support the operator seat 6. That is, the mounting plate 19 is disposed behind the operator seat 6.

The canopy 7 according to the present invention includes a front support pillar 20 erected on the front pedestal 11, a support member 21 mounted on the mounting plate 19 of the seat stand 10, an upper protective frame 22 which is held above the operator seat 6 by the front support pillar 20 and the support member 21, and a roof 35 which covers the upper protective frame 22.

The front support pillar 20 includes a support pillar body 23 erected on a right upper surface of the front pedestal 11 and a handrail portion 24, the handrail portion 24 extending leftwards from an intermediate portion of the support pillar body 23 and being bent downward and fixed to a left upper surface of the front pedestal 11. The upper protective frame 22 is supported by an upper end portion of the support pillar body 23.

The support member 21 is a single metallic pipe fixed onto the mounting plate 19 through a tubular member 25. The tubular member 25 is fixed onto the mounting plate 19 with a pair of right and left bolts B3 in an attitude of its axis facing in the transverse direction.

More specifically, the support member 21 includes a fixing portion 26 which is inserted into the tubular member 25 and a right support pillar 27 and a left support pillar 28 which are bent upward from both right and left sides of the tubular member 25.

With the fixing portion 26 inserted into the tubular member 25, a nut B2 is brought into threaded engagement with a bolt B3 which extends vertically through the tubular member 25, the fixing portion 26 and the mounting plate 19, whereby the fixing portion 26 is fixed onto the mounting plate 19 in an attitude of its axis facing in the transverse direction.

As shown in FIGS. 2 and 3, the right support pillar 27 includes a rising portion 29 which extends upward from the mounting plate 19 while expanding rightwards and a connecting portion 30, the connecting portion 30 tilting forward from an upper end of the rising portion 29 while bending, or closing, leftwards and being connected to the upper protective frame 22.

The left support pillar 28 includes a connecting portion 31, the connecting portion 31 tilting forward from the mounting plate 19 while expanding leftwards and extending up to sideways of the left side of the operator seat 6, and a protective portion 32, the protective portion 32 extending upward from an upper end of the connecting portion 31 while bending, or closing, rightwards and being connected to the upper protective frame 22.

As shown in the side view of FIG. 2, the protective portion 32 is disposed within a range D1 of a seating surface 6*a* of the operator seat 6 and within an upper range from a position lower than an upper end position P1 of a back rest 6*b* of the operator seat 6. Therefore, even in the event that the small-sized hydraulic excavator 1 should turn sideways, the operator H can be protected from the left side by the protective portion 32.

More particularly, it is preferable that the protective portion 32 be disposed within a thickness range D2 of an upper half of a body of the operator H sitting on the operator seat 6 and that a lower end of the protective portion 32 be located at a position lower than a height position P2 of a shoulder H1 of the operator H. With this arrangement, a head of the operator H can be protected positively by the protective portion 32.

In the case where a control box 33 for actuating the front attachment 4 is disposed on the left side of the operator seat 6, as shown in FIGS. 2 and 3, it is preferable that the protective portion 32 be located in an upper range with respect to an upper position P3 of the control box 33. With this arrangement, the operator H can be protected from the left side by the control box 33 with respect to the range lower than the upper position P3 and can be protected from the left side by the protective portion 32 with respect to a range higher than the upper position P3.

Referring to FIGS. 1 and 5, the device cover 8 is mounted on the rotating frame 5 so as to incorporate various driving devices (e.g., a working oil tank 34) mounted on the rotating frame 5 and surrounding the rear and side portions of the seat stand 10. In the present embodiment the working oil tank 34 is disposed on the left side of the seat stand 10.

The upper protective frame 22 is frame-shaped in plan as in FIG. 4 and is connected to upper ends of the support pillar body 23, the right support pillar 27 and the left support pillar 28, with the roof 35 as a synthetic resin roof mounted thereon. No limitation is made to configuring the upper protective frame 22 and the roof 35 separately, but both may be formed integrally.

According to the small-sized hydraulic excavator 1, by providing the protective portion 32 contiguously to the connecting portion 31 extending forward from the fixing portion 26 which is fixed onto the rotating frame 5 at a position behind the operator seat 6, the operator seat 6 can be protected sideways by the protective portion 32. Thus, unlike the case where a support pillar is mounted directly on the rotating frame 5, the left support pillar (protective pillar) 28 can be disposed by utilizing the space at a position behind the operator seat 6 which space has heretofore been unused, without changing the layout of the working oil tank 34 on the rotating frame 5 or the like.

Therefore, according to the small-sized hydraulic excavator 1, as shown in FIG. 5, even when the space on the left side of the operator seat 6 and on the rotating frame 5 is limited by the working oil tank 34, the left support pillar 28 can be installed without changing the layout of the working oil tank 34 on the rotating frame 5 or the like. Consequently, in the event that the working machine should turn sideways, it is possible to protect the operator seat 6 while keeping the working efficiency for maintenance of the working oil tank 34 to a satisfactory extent.

Moreover, according to the small-sized hydraulic excavator 1, since the fixing portion 26 is fixed onto the seat stand 10, the overall length of the left support pillar 28 can be made shorter than in case of fixing the fixing portion 26 to the frame body 9, and hence a sectional area of the left support pillar 28 necessary for ensuring the same strength can be so much decreased. As a result, not only the sight of the operator H can be ensured to a satisfactory extent, but also cost of the left support pillar 28 can be reduced by the shortening of the overall length and the decrease of the sectional area.

According to the small-sized hydraulic excavator 1 wherein the fixing portion 26 is fixed to the rotating frame 5 in an attitude of its axis facing in the transverse direction (the direction orthogonal to the vertical and longitudinal directions), an external force applied when the working machine turns sideways (an external force which the left support pillar 28 undergoes upon collision with the ground) is inputted in the axial direction of the fixing portion 26. Therefore, the left support pillar 28 can be prevented from undergoing a flexural deformation in the fixing portion (fixing portion 26) fixed to the rotating frame 5 due to the external force. Thus, protective strength of the operator seat 6 can be further improved.

Although in the small-sized hydraulic excavator 1 the connecting portion 31 and the protective portion 32 are provided for the left support pillar 28 out of the pair of right and left support pillars 27 and 28 erected at a position behind the operator seat 6, the connecting portion 31 and the protective portion 32 may be provided for each of the right and left support pillars 27 and 28. By so doing, the operator seat 6 can be protected from both right and left sides by the right and left support pillars 27, 28.

On the other hand, for example when the operator seat 6 is offset to either the right or the left of the frame body 9 in plan, it is preferable that either the right support pillar 27 or the left support pillar 28 be provided with the protective portion 32, taking into account the case where the working machine turns sideways to at least the offset side.

Further according to the small-sized hydraulic excavator 1 wherein the upper protective frame 22 is held above the operator seat 6 by the front, right and left support pillars 20, 27 and 28, the external force which is inputted to the protective portion 32 when the working machine turns sideways can be dispersed to the front and right support pillars 20 and 27 through the upper protective frame 22. Therefore, it is possible to prevent the left support pillar 28 from being deformed to an extreme extent due to the external force and hence possible to protect the operator seat 6 in a more positive manner.

Although the invention has been described with reference to the preferred embodiments in the attached figures, it is noted that equivalents may be employed and substitutions made herein without departing from the scope of the invention as recited in the claims.

I claim:

1. A working machine having a canopy structure, comprising:
   a lower traveling body;
   an upper rotating body mounted rotatably on said lower traveling body, said upper rotating body having a rotating frame;
   an operator seat disposed on top of said rotating frame; and
   a protective pillar erected on said rotating frame to protect said operator seat sideways, said protective pillar comprising:
   a protective portion extending substantially vertically at a position in front of a back rest of said operator seat, so as to cover said operator seat sideways;

a fixing portion fixed onto said rotating frame at a position behind said operator seat; and a connecting portion extending forward from said fixing portion and connected to a lower end of said protective portion, wherein said protective portion is disposed above a seating surface of said operator seat in side view, and extends upward from a position lower than an upper end of said back rest.

2. The working machine according to claim 1, further comprising an upper protective frame which is held above said operator seat, said upper protective frame being connected to an upper end of said protective portion.

3. The working machine according to claim 1, wherein said rotating frame includes a frame body secured to said lower traveling body and a support frame projected on said frame body to support said operator seat, and said fixing portion is fixed to an upper portion of said support frame.

4. The working machine according to claim 1, wherein said fixing portion is fixed to said rotating frame in an attitude such that an axis thereof is orthogonal to a vertical direction and an advancing direction of said lower traveling body.

5. The working machine according to claim 1, wherein a pair of right and left pillar members are erected on said rotating frame and behind said operator seat, at least one of said pillar members corresponding to said protective pillar.

6. The working machine according to claim 5, wherein both said pillar members correspond to said protective pillar.

7. The working machine according to claim 5, wherein said upper protective frame is supported by a front support pillar and said pillar members, said front support pillar being erected on said rotating frame in front of said operator seat.

8. The working machine according to claim 1, further comprising at least one working device capable of protecting said operator seat, and mounted on the upper rotating body directly below said protective portion.

9. The working machine according to claim 8, wherein said working device is a control box for a working attachment.

10. The working machine according to claim 8, wherein said working device is a working oil tank.

* * * * *